United States Patent [19]
Cairns et al.

[11] 3,860,617
[45] Jan. 14, 1975

[54] BENZOPYRANS
[75] Inventors: Hugh Cairns; Dennis Hunter; John King, all of Loughborough, England
[73] Assignee: Fisons Limited, London, England
[22] Filed: Sept. 8, 1972
[21] Appl. No.: 287,546

[52] U.S. Cl................ 260/345.2, 424/283, 260/520
[51] Int. Cl............................................. C07d 7/32
[58] Field of Search................................. 260/345.2

[56] References Cited
UNITED STATES PATENTS
3,718,668  2/1973  Cairns et al..................... 260/345.2

Primary Examiner—John M. Ford
Attorney, Agent, or Firm—Wenderoth, Lind & Ponack

[57] ABSTRACT
There are described compounds of formula I,

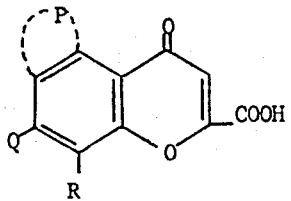

in which Q and R, which may be the same or different, are each hydrogen or alkyl, P, together with the adjacent carbon atoms in the benzene ring, forms a 5 or 6 membered saturated carbocyclic or oxygen containing heterocyclic ring, which ring may carry an alkyl substituent, and pharmaceutically acceptable derivatives thereof.

The compounds are indicated for use in the treatment of asthma.

10 Claims, No Drawings

BENZOPYRANS

This invention relates to new compounds, processes for their production and compositions containing them.

According to our invention we provide compounds of formula I,

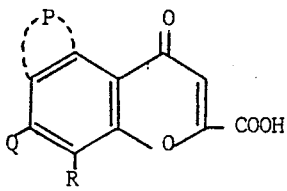

in which Q and R, which may be the same or different, are each hydrogen or alkyl, P, together with the adjacent carbon atoms in the benzene ring, forms a 5 or 6 membered saturated carbocyclic or oxygen containing heterocyclic ring, which ring may carry an alkyl substitutent, and pharmaceutically acceptable derivatives thereof.

According to our invention we also provide a process for the production of a compound of formula I, or of a pharmaceutically acceptable derivative thereof, which comprises (a) cyclising a compound of formula II,

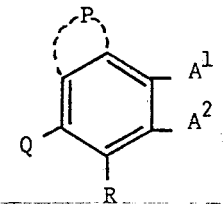

in which P, Q and R are as defined above, and $A^1$ and $A^2$ represent the pairs of groups i. —COCH$_2$COCOR'' and —OM, or
ii. —H and —O—C(COOM)=CH—COOM in which R'' represents —OH, or a group which is hydrolysable thereto, and M represents hydrogen or an alkali metal, and if necessary or desirable hydrolysing the group R'', b. selectively hydrolysing a compound of formula III,

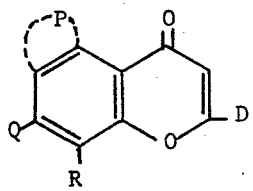

in which P, Q and R are as defined above, and
D is a group hydrolysable to a —COOH group, or c. producing a compound of formula Ic,

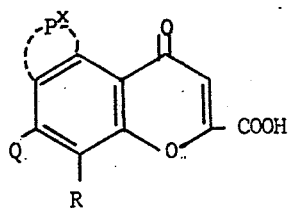

or an ester thereof, in which Q and R are as defined above, and
P$^x$ together with the adjacent carbon atoms in the benzene ring forms an oxygen containing 5 or 6 membered saturated heterocyclic ring, in which the oxygen atom is adjacent to the benzene ring and in which the heterocyclic ring may carry an alkyl substituent, by cyclising a compound of formula IV,

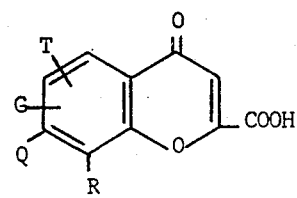

or an ester thereof, in which Q and R are as defined above,

T represents a hydroxy group, or a 2 or 3 membered alkylene chain carrying an anion forming group and optionally also an alkyl group, G represents (i) a 2 or 3 membered hydrocarbon chain carrying an anion forming group and optionally also an alkyl group, when T represents a hydroxy group, or ii. a hydroxy group when T represents a 2 or 3 membered hydrocarbon chain carrying an anion forming group and optionally also an alkyl group, and where desired or necessary converting the compound of formula I to a pharmaceutically acceptable derivative thereof.

The cyclisation of process (a) (i) may be carried out by heating, or under basic or neutral conditions. It is however preferred to carry out the cyclisation in the presence of an acid, e.g. hydrochloric acid, and in a solvent which is inert under the reaction conditions. The reaction may be carried out at from about 20° to 150°C. The group —COR'' is preferably an ester group.

The cyclisation of process (a)(ii) may be carried out by treating the appropriate compound of formula II with a cyclising agent, for example a dehydrating agent such as chlorosulphonic, polyphosphoric or sulphuric acid. The reaction is preferably carried out under anhydrous conditions and may be carried out at a temperature of from about 0° to 100°C. Alternatively cyclisation may be achieved by converting the free carboxy groups of the compound of formula II to acyl halide groups and subjecting the resulting acyl halide to an intramolecular Friedel-Crafts reaction.

In process (b) the group D may be, for example an ester, acid halide, amide or a nitrile group, which may be hydrolysed to a —COOH group. The hydrolysis may be carried out using conventional techniques, for example under mildly basic conditions, e.g. using sodium carbonate, sodium bicarbonate, or under acidic conditions, e.g. a mixture of aqueous dioxan and hydrochloric acid, or hydrogen bromide in acetic acid. The hydrolysis may be carried out at a temperature of from about 25° to 120°C depending on the compounds used.

In process (c) the anion forming group may be a halogen, e.g. chlorine, bromine or iodine, atom. The reaction may be carried out in a solvent which is inert under the reaction conditions, e.g. acetone, and is preferably carried out in the presence of an acid acceptor, e.g. postassium carbonate.

The compounds of formulae II, III, and IV may be made from known starting materials using conventional techniques.

The compounds of formula I and the intermediates therefore may be isolated from their reaction mixtures using conventional techniques.

Pharmaceutically acceptable derivatives of the compounds of formula I include pharmaceutically acceptable salts, esters and amides of the 2-carboxylic acid group. Suitable salts include ammonium,, alkali metal (e.g. sodium, potassium and lithium) and alkaline earth metal salts (e.g. calcium or magnesium) and salts with suitable organic bases, e.g. salts with C 1 to 6 alkyl amines such as methylamine or ethylamine, with substituted C 1 to 6 alkylamines, e.g. hydroxy substituted alkylamines or with simple 5 or 6 membered monocyclic nitrogen heterocyclic compounds, e.g. piperidine or morpholine. Suitable esters include simple C 1 to 6 alkyl esters, and esters derived from alcohols containing basic groups, e.g. di-C 1 to 6 alkyl amino substituted C 1 to 6 alkanols. The pharmaceutically acceptable salts of such basic esters, e.g. the hydrochloride, may also be used.

The compounds of formula I and pharmaceutically acceptable derivatives thereof are useful because they possess pharmacological activity in animals; in particular they are useful because they inhibit the release and/or action of pharmacological mediators which result from the in vivo combination of certain types of antibody and specific antigen e.g. the combination of reaginic antibody with specific antigen (see Example A). In man, both subjective and objective changes which result from the inhalation of specific antigen by sensitised subjects are inhibited by prior administration of the new compounds. Thus the new compounds are useful in the treatment of asthma, e.g. allergic asthma. The new compounds are also useful in the treatment of so-called "intrinsic" asthma (in which no sensitivity to extrinsic antigen can be demonstrated). The new compounds are also of use in the treatment of other conditions in which antigen-antibody reactions are responsible for disease, for example, hay fever and urticaria.

For the above mentioned uses the dosage administered will, of course, vary with the compound employed, the mode of administration and the treatment desired. However, in general, satisfactory results are obtained when the compounds are administered at a dosage of from 0.1 to 50 mg per kg of animal body weight in the test set out in Example A. For man the total daily dosage is in the range of from about 1 mg to 3,500 mg, preferably 5 to 1,500 mg and more preferably 10 to 1,000 mg which may be administered in divided doses from 1 to 6 times a day or in sustained release form. Thus dosage forms suitable for administration (by inhalation or oesophageally) comprise from about 0.17 mg to 600 mg of the compound admixed with a solid or liquid pharmaceutically acceptable diluent or carrier.

According to our invention we also provide a pharmaceutical composition comprising a compound formula I, or a pharmaceutically acceptable derivative thereof, in combination with a pharmaceutically acceptable adjuvant, diluent or carrier. Examples of suitable adjuvants, diluents or carriers are:- for tablets and dragees; lactose, starch, talc or stearic acid; for capsules, tartaric acid or lactose; for suppositories; natural or hardened oils or waxes; for inhalation compositions, coarse lactose. The compositions may also contain suitable preserving, stabilising and wetting agents, solubilizers, sweetening and colouring agents and flavourings. The compositions may, if desired, be formulated in sustained release form. We prefer compositions which are designed to be taken oesophageally and to release their contents in the gastrointestinal tract.

Specific values of Q and R are hydrogen, and alkyl containing from 1 to 6 carbon atoms. It is preferred that R is alkyl and Q is hydrogen. The alkyl substituent in the group P preferably contains from 1 to 6 carbon atoms. Specific values of P are groups $-(CH_2)_4-$, $-(CH_2)_3-O-$, $-CH_2CH(CH_3)-O-$, and $-CH(CH_3)CH_2-O-$; thus when P is an oxygen containing group it preferably contains a single oxygen atom. It is also preferred that the oxygen atom should be adjacent to the benzene ring.

According to our invention we also provide a process for the production of a pharmaceutically acceptable salt of a compound of formula I, which comprises treating a compound of formula I, another salt thereof, an ester or amide thereof with an appropriate base, or with an appropriate salt by a metathetical process.

The invention is illustrated but in no way limited by the following examples, in which all parts and percentages are by weight unless otherwise stated and the temperatures are in degrees centigrade.

EXAMPLE 1

8-Ethyl-cyclohexano (f) chromone-2-carboxylic acid a. 2-Ethyl-3-hydroxy-5,6,7,8-tetrahydronaphthalene A mixture of 120 parts of zinc wool, 12 parts of mercuric chloride, 200 parts of water and 7 parts of concentrated hydrochloric acid was shaken vigorously for 10 minutes. The solution was then removed by decantation, and to the remaining amalgamated zinc were added 85 parts of toluene, 210 parts of concentrated hydrochloric acid, 70 parts of water and 53 parts of 3-acetyl-2-hydroxy-5,6,7,8-tetrahydronaphthalene. The mixture was heated under reflux for 48 hours, and at intervals, of 10 to 15 hours throughout further lots of 50 parts of concentrated hydrochloric acid were added. After cooling, the mixture was filtered, and the residue was washed with ether. The layer of organic solvent (which contained the product) was separated and the aqueous layer was extracted with ether. The combined non-aqueous solution was washed several times with water and dried over anhydrous sodium sulphate. After filtration, the solvent was removed to leave 47.2 parts of the crude product m.p. 48°–52°C, which crystallised from petrol to give pure 3-ethyl-2-hydroxy-5,6,7,8-tetrahydronaphthalene m.p. 54°–55°.
Analysis:
Found: C, 81.2; H, 9.2%: $C_{12}H_{16}O_2$ requires: C, 81.8; H, 9.2% b. 2-Acetoxy-3-ethyl-5,6,7,8-tetrahydronaphthalene

To a mixture of 40 parts of 3-ethyl-2-hydroxy-5,6,7,8-tetrahydronaphthalene and 88 parts of acetic anhydride was added 1 drop (0.1 parts) of concentrated sulphuric acid. The mixture darkened and became warm. After standing for 30 minutes it was heated on the steam bath for a further 15 minutes. It was then cooled and poured into a mixture of ice and water. The excess of acetic anhydride was decomposed by heating gently on the steam bath for 30 minutes. After cooling, the product was extracted with ether, washed with water, dried over sodium sulphate, filtered and distilled, after evaporation of the ether, to give 36 parts of 2-acetoxy-3-ethyl-5,6,7,8-tetrahydronaphthalene, boiling point 156°–162° at 8 mm pressure.
Analysis:

Found: C, 76.0; H, 8.2%: $C_{14}H_{18}O_2$ requires: C, 77.0; H, 8.3% c. 1-Acetyl-3-ethyl-2-hydroxy-5,6,7,8-tetrahydronaphthalene

A mixture of 10 parts of 2-acetoxy-3-ethyl-5,6,7,8-tetrahydronaphthalene and 8.5 parts of anhydrous aluminium chloride was heated to 135° in an oil bath, and the temperature was maintained for 30 minutes with occasional stirring. The brownish reaction mass was decomposed with 90 parts of ice and 12 parts of concentrated hydrochloric acid. The yellow oil obtained was extracted with ether and the ether extract was washed with water and dried over sodium sulphate. After filtration, the solvent was removed and the residual oil was dissolved in ethyl acetate and chromatographed on an alumina column, using ethyl acetate as eluting medium. The fractions containing the first product to be eluted were combined and the solvent was evaporated. The residual oil crystallised on standing and gave 1.3 parts of 1-acetyl-3-ethyl-2-hydroxy-5,6,7,8-tetrahydronaphthalene, m.p. 30.5°–32.5°, after crystallisation from petrol.

Analysis:
Found: C, 76.7; H, 8.4%: $C_{14}H_{18}O_2$ requires: C, 77.0; H, 8.3%

It was later found that the crude product before chromatography was sufficiently pure to use in the subsequent stage of the synthesis.

d. Ethyl 8-ethyl-cyclohexano (f) chromone-2-carboxylate

A solution of sodium ethoxide was prepared from 3.7 parts of sodium and 60 parts of ethanol. To this was added, with stirring over 10 minutes, a mixture of 8.7 parts of 1-acetyl-3-ethyl-2-hydroxy-5,6,7,8-tetrahydronaphthalene and 14 parts of diethyl oxalate in 22 parts of dry ether were added and the whole was heated gently under reflux for 2 hours with stirring. After cooling, the mixture was acidified with acetic acid and water was added. The ether was distilled off by gentle heat and the substituted pyruvic acid ester was extracted with chloroform. The chloroform extracts were washed with water, sodium bicarbonate solution, water, and dried over sodium sulphate, filtered and the solvent was removed. The residual substituted pyruvic acid ester was cyclised by heating with 27 parts of ethanol and 0.5 parts of concentrated hydrochloric acid for 10 minutes on the steam bath. After filtration of the hot solution, 4.8 parts of the required ethyl 8-ethyl-cyclohexano (f) chromone-2-carboxylate, m.p. 136°–137°, crystallised from the filtrate.

Analysis:
Found: C, 71.7; H, 6.9%: $C_{18}H_{20}O_4$ requires: C, 72.0; H, 6.7% e. 8-Ethyl-cyclohexano (f) chromone-2-carboxylic acid

A mixture of 1.75 parts of ethyl 8-ethyl-cyclohexano (f) chromone-2-carboxylate and 1.75 parts of sodium bicarbonate in 20 ml. water was heated with stirring on the steam bath for 18 hours. The solution was filtered and acidified with hydrochloric acid to give 1.45 parts of the desired 8-ethyl-cyclohexano (f) chromone-2-carboxylic acid, m.p. 274°–276°C. It was recrystallised from ethanol to give 1.20 parts of the pure product. m.p. 275°–276°.

Analysis:
Found: C, 70.4; H, 6.0%: $C_{16}H_{16}O_4$ requires: C, 70,6; H, 5.9% f. Sodium 8-ethyl-cyclohexano (f) chromone-2-carboxylate

A mixture of 0.68 parts of 8-ethyl-cyclohexano (f) chromone-2-carboxylic acid and 0.21 parts of sodium bicarbonate in 50 parts of water was stirred for several minutes. The solution was filtered and freeze-dried to give sodium 8-ethyl-cyclohexano (f) chromone-2-carboxylate.

EXAMPLE 2

8-Ethyl-2'3'-dihydropyrano[6,5,-f]chromone-2-carboxylic acid a. 7-Acetoxy-6-ethylchroman A solution of 10.8 parts of 6-ethyl-7-hydroxychroman and 5.76 parts of acetyl chloride in 14.4 parts of acetic acid was heated under reflux for 10 minutes. The solution was poured whilst still hot, into water to give a yellow oil.

The oil was extracted into diethyl ether. The ethereal solution was washed twice with 10% sodium hydroxide solution, then with water and dried over sodium sulphate. The diethyl ether was evaporated to leave 10.75 parts of 7-acetoxy-6-ethylchroman as a yellow oil, b.p. 172°–6° at 15 mms pressure.

b. 8-Acetyl-6-ethyl-7-hydroxychroman

A mixture of 5.0 parts of 7-acetoxy-6-ethylchroman and 4.25 parts of aluminium chloride was heated at 160° for ½ hour. Ice and concentrated hydrochloric acid were added to give a green oil. The oil was extracted into diethyl ether, the ethereal solution was treated with charcoal, filtered and evaporated to leave an oil.

This oil was extracted into light petroleum (boiling-range 40°–60°C). The petroleum solution was treated with charcoal, filtered and evaporated to leave 2.9 parts of a brown oil. This brown oil was chromatographed on alumina using light petroleum (boiling range 40°–60°) as eluting agent. Evaporation of the solvent gave 2.25 parts of 8-acetyl-6-ethyl-7-hydroxychroman which crystallised from aqueous ethanol as yellow needles, m.p. 50°.

Analysis:
Found: C, 71.2; H, 6.98%: $C_{13}H_{16}O_3$ requires: C, 70.89; H, 7.32% c. 8-Ethyl-2'3'-dihydropyrano[6,5-f]chromone-2-carboxylic acid, hemihydrate

To a stirred solution of sodium ethoxide in ethanol, prepared from 0.95 parts of sodium in 15 parts of ethanol, was added a slurry of 2.2 parts of 8-acetyl-6-ethyl-7-hydroxychroman and 3.6 parts of diethyl oxalate in 20 parts of diethyl ether. The mixture was then heated under gentle reflux for 3 hours.

After cooling, diethyl ether and water were added and the aqueous layer was separated and acidified with dilute hydrochloric acid. The acidified solution was extracted with chloroform, the chloroform extract was dried over sodium sulphate, filtered and the chloroform was distilled off to leave an orange solid. This solid was dissolved in boiling ethanol and 0.2 parts of concentrated hydrochloric acid were added.

On cooling 0.65 parts of a solid crystallised as yellow needles m.p. 245°–6°C. This material was dissolved in aqueous sodium bicarbonate and 8-ethyl-2'3'-dihydropyrano[6,5-f]chromone-2-carboxylic acid, hemihydrate was precipitated as a yellow solid m.p. 256°–7°, on acidification with dilute hydrochloric acid.

Analysis:

Found: C, 63.2; H, 5.01%: $C_{15}H_{14}O_5.\frac{1}{2}H_2O$ requires: C, 63.5; H, 5.3% d. Sodium 8-ethyl-2'3'-dihydropyrano-[6,5-f]-chromone-2-carboxylate

A solution of 0.5 parts of 8-ethyl-2'2'-dihydropyrano[6,5,-f]chromone-2-carboxylic acid, hemihydrate and 0.17 parts of sodium bicarbonate in 40 parts of water was freeze-dried to give 0.5 parts of sodium 8-ethyl-2'3'-dihydropyrano[6,5-f]chromone-2-carboxylate.

EXAMPLE 3

2-Methyl-9-oxo-9H-2,3-dihydrofuro[5,4-f](1) benzopyran-7-carboxylic acid a. Ethyl 6-allyl-5-hydroxychromone-2-carboxylate 3.44 Parts of ethyl 5-allyloxychromone-2-carboxylate was heated in a test-tube at 200° for 1½ hours. On cooling, the mass solidified and was dissolved in diethyl ether.

The ethereal solution was chromotographed on alumina using diethyl ether as the eluting medium. The diethyl ether solution was concentrated to a small volume to give 2.5 parts of ethyl 6-allyl-5-hydroxychromone-2-carboxylate as yellow plates m.p. 99°–100°.
Analysis:
Found: C, 65.5; H, 5.25%: $C_{15}H_{14}O_5$ requires : C, 65.69; H, 5.15% b. Ethyl 6-(2-bromopropyl)-5-hydroxychromone-2-carboxylate

To a solution of 3 parts of ethyl 6allyl-5-hydroxychromone-2-carboxylate in 250 parts of dry chloroform, were added 0.3 parts of anhydrous ferric chloride. the mixture was cooled in an ice-bath and gaseous hydrogen bromide was passed for 45 minutes. The solution was then left at room temperature for 24 hours.

The chloroform was distilled off and the remaining oil was chromatographed on alumina using diethyl ether as eluting agent. The diethyl ether was evaporated to leave 1.73 parts of a brown solid. This was crystallised from light petroleum (boiling range 40°–60°) to give ethyl 6-(2-bromopropyl)-5-hydroxychromone-2-carboxylate as brown prisms, m.p. 97°.
Analysis:
Found: C, 51.5; H, 4.51%: $C_{15}H_{15}BrO_5$ requires: C, 50.7; H, 4.22% c. Ethyl 2-methyl-9-oxo-9H-2,3-dihydrofuro [5,4-f](1) benzopyran-7-carboxylate

A mixture of 1.73 parts of ethyl 6-(2-bromopropyl)-5-hydroxychromone-2-carboxylate and 3.0 parts of anhydrous potassium carbonate in 100 parts of dry acetone was heated under reflux for 18 hours.

The solid was filtered off and washed twice with 20 parts of hot acetone. The acteone solution was treated with charcoal and filtered and the acetone was distilled off to leave a brown solid.

This solid was shaken with light petroleum (boiling range 40°–60°) the supernatant liquid was decanted and the insoluble material was crystallised from diethyl ether to give 0.75 parts of ethyl 2-methyl-9-oxo-9H-2,3-dihydrofuro[5,4-f](1) benzopyran-7-carboxylate as colourless needles m.p. 118°–20°.
Analysis:
Found: C, 65.2; H, 5.12%; $C_{15}H_{14}O_5$ requires: C, 65.69; H, 5.15% d. 2-Methyl-9-oxo-9H-2,3-dihydrofuro[5,4-f](1) benzopyran-7-carboxylic acid, monohydrate A stirred suspension of 0.5 parts of ethyl 2-methyl-9-oxo-9H-2,3-dihydrofuro[5,4-f](1) benzopyran-7-carboxylate in 30 parts of aqueous sodium bicarbonate solution was heated on the steam-bath until all the solid had dissolved. The solution was treated with charcoal, filtered and acidified with dilute hydrochloric acid to give 0.33 parts of 2-methyl-9-oxo-9H-2,3-dihydrofuro[5,4-f](1) benzopyran-7-carboxylic acid monohydrate as yellow needles m.p. 237°–9°.
Analysis:
Found: C, 58.5; H, 4.43%: $C_{13}H_{10}O_5.H_2O$ requires: C, 59.1; H, 4.55% e. Sodium 2-methyl-9-oxo-9H-2,3-dihydrofuro[5,4-f](1)benzopyran-7-carboxylate

A solution of 0.33 parts of 2-methyl-9-oxo-9H-2,3-dihydrofuro[5,4-f][1]benzopyran-7-carboxylate in 30 parts to aqueous sodium bicarbonate solution was heated on a steam-bath until all the solid had dissolved. The solution was treated with charcoal, filtered and acidified with dilute hydrochloric acid to give 0.33 parts of 2-methyl-9-oxo-9H-2,3-dihydrofuro[5,4-f][1]benzopyran-7-carboxylic acid monohydrate as yellow needles m.p. 237°–9°.
Analysis:
Found: C, 58.5; H, 4.43%: $C_{13}H_{10}O_5.H_2O$ requires: C, 59.1; H, 4.55% e. Sodium 2-methyl-9-oxo-9H-2,3-dihydrofuro[5,4-f][1]benzopyran-7-carboxylate

A solution of 0.33 parts of 2-methyl-9-oxo-9H-2,3-dihydrofuro[5,4-f][1]benzopyran-7-carboxylic acid, monohydrate and 0.1 parts of sodium bicarbonate in 20 parts of water was freeze-dried to give 0.34 parts of sodium 2-methyl-9-oxo-9H-2,3-dihydrofuro[5,4-f][1]benzopyran-7-carboxylate as a white solid.

EXAMPLE 4

3-Methyl-9-oxo-9H-furo[2,3-f][1]benzopyran-7-carboxylic acid

A slurry of 8.15 parts of 7-acetyl-6-hydroxy-3-methyl-benzofuran and 16 parts of diethyl oxalate was run into a cooled solution of sodium ethoxide in ethanol (prepared from 3.9 parts of sodium and 60 parts of ethanol) and 80 parts of diethyl ether with stirring. The slurry was washed in with 160 parts of diethyl ether and the mixture was heated under reflux for 3 hours.

After cooling, diethyl ether and water were added, and the aqueous layer was separated and acidified with dilute hydrochloric acid. The precipitate was extracted with chloroform, the chloroform extract was dried over sodium sulphate, filtered and evaporated to leave an oil. This oil was heated under reflux with ethanol and 0.5 parts of concentrated hydrochloric acid for 10 minutes. On cooling a yellow solid crystallised.

This solid was shaken with a cold aqueous solution of sodium bicarbonate and the insoluble material was filtered off and dissolved in hot ethanol, treated with charcoal and filtered. On cooling, the solution yielded ethyl 3-methyl-9-oxo-9H-furo [2,3-f][1]benzopyran-7-carboxylate as yellow crystals, m.p. 176°–8°.
Analysis:
Found: C, 65.80; H, 4.37%: $C_{15}H_{12}O_5$ requires: C, 66.17; H, 4.44%

The aqueous sodium bicarbonate extract was treated with charcoal, filtered, and acidified with dilute hydrochloric acid. The precipitated solid was filtered off and crystallised from ethanol to give 2.57 parts of 3-methyl-9-oxo-9H-furo[2,3-f][1]benzopyran-7-carboxylic acid, melting point 258°–9°.

Analysis:

Found: C, 63.10; H, 3.52%: $C_{13}H_8O_5$ requires: C, 63.94; H, 3.30%

Equivalent weight

Found: 244.10 $C_{13}H_8O_5$ requires: 244.19

A mixture of 1.0 parts of 3-methyl-9-oxo-9H-furo[2,3-f][1]benzopyran-7-carboxylic acid and 0.345 parts of sodium bicarbonate was dissolved in 30 parts of water. The solution was treated with charcoal, filtered and freeze-dried to yield 0.81 parts of sodium 3-methyl-9-oxo-9H-furo[2,3-f][1]benzopyran-7-carboxylate as a white powder.

EXAMPLE 5

8-Ethyl-cyclohexano[f]chromone-2-carboxylic acid

To 3.5 parts of 3-ethyl-2-hydroxy-5,6,7,8,-tetrahydronaphthalene (prepared as in Example 1a) in dioxan (25 parts) were added 3.1 parts of the dimethyl ester of acetylene dicarboxylic acid followed by 0.2 parts of benzyltrimethylammonium hydroxide. The mixture was heated on a steam bath for 20 minutes, cooled and treated with 13 parts of 25% aqueous sodium hdyroxide solution and heated on the steam bath for 90 minutes. The mixture was cooled, extracted with ether to remove dioxan and acidified with 5N sulphuric acid. The mixture was again extracted into ether and the ether extracts were washed, dried and the ether removed to give (3-ethyl-5,6,7,8-tetrahydroronaphth-2-oxy) fumeric acid. This material was added slowly to 8.75 parts of chlorosulphonic acid per part of the naphthoxy fumaric acid. The solution was allowed to stand for 5 minutes and an equal volume of concentrated sulphuric acid was added. After mixing well the mixture was warmed at 50° for 5 minutes, cooled and slowly poured onto ice. The precipitate was filtered off, washed with water, dried and crystallised from ethanol to give 0.4 parts of 8-ethyl-cyclohexano[f] chromone-2-carboxylic acid m.p. 275°–276°.

EXAMPLE A

The procedure set out below may be used to assess the effectiveness of a compound in inhibiting the release of the pharmacological mediators of anaphylaxis.

In this test, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Charles River France/Fisons bred rats (male or female) having a body weight of from 100 to 150 gms are infected subcutaneously at weekly intervals with N. brasiliensis larvae in doses increasing from about 2000 larvae per animal to 12,000 larvae per animal in order to establish the infection. After 8 weeks the rats are bled by heart puncture and 15–20 mls. of blood collected from each animal. The blood samples are then centrifuged at 3,500 rpm. for 30 minutes in order to remove the blood cells from the blood plasma. The serum is collected and used to provide a serum containing N. brasiliensis antibody. A pilot sensitivity test is carried out to determine the least quantity of serum required to give a skin weal in control animals in the test described below of 2 cm diameter. It has been found that optimum sensitivity of rats in the body weight range 100–130 gms is obtained using a serum diluted with eight parts of physiological saline solution. This diluted solution is called antibody serum A.

The antigen to react with the antibody in serum A is prepared by removing N. brasiliensis worms from the gut of the infested rats, centrifuging the homogenate and collecting the supernatent liquor. This liquor is diluted with saline to give a protein content of 1 mg/ml and is known as solution B.

Charles River France/Fisons bred rats in the body weight range 100 to 130 gms are sensitised by intradermal injection of 0.1 mls of serum A into the right flank. Sensitivity is allowed to develop for 24 hours and the rats are then injected intravenously with 1 ml/100 gms body weight of a mixture of solution B (0.25 mls), Evans Blue dye solution (0.25 mls) and the solution of the compound under test (0.5 mls varying percentages of active matter). Insoluble compounds are administered as a separate intraperitoneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins removed and reversed. The intensity of the anaphylactic reaction is assessed by comparing the size of the characteristic blue weal produced by spread of the Evans Blue dye from the sensitisation site, with the size of the weal in the control animals. The size of the weal is rated as 0 (no weal detected, i.e., 100 percent inhibition) to 4 (no difference in size of weal, i.e no inhibition) and the percentage inhibition for each dose level calculated as:

$$\% \text{ inhibition} = \frac{(\text{Control group score} - \text{treated group score}) \times 100}{\text{Control group score}}$$

The precentage inhibitions for the various dose levels are plotted graphically for each compound. From these graphs the dosage required to achieve a 50 percent inhibition of the anaphylactic reaction ($ID_{50}$) may be determined.

The compounds are also evaluated in the above manner using intestinal and gastric administration of the compound.

We claim:

1. A compound of formula I,

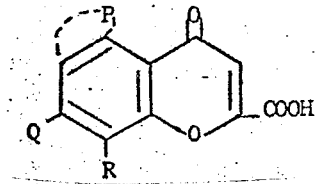

in which Q and R, which may be the same or different, are each hydrogen or alkyl C 1 to 6, P represents a 3 or 4 membered alkylene chain or a 2 or 3 membered alkylene chain interrupted or terminated by an oxygen atom, which chains are unsubstituted or are substituted by an alkyl C 1 to 6 substituent, and pharmaceutically acceptable carboxylic acid salts, C 1 to 6 alkyl esters, esters of di C 1 to 6 alkyl amino substituted C 1 to 6 alkanols or pharmaceutically acceptable salts of such esters and unsubstituted amides thereof.

2. A compound according to claim 1, wherein P is $-(CH_2)_4-$, $-(CH_2)_3-O-$, $-CH_2CH(CH_3)-O-$, or $-CH(CH_3)CH_2-O-$.

3. A compound according to claim 1, wherein R is alkyl C 1 to 6 and Q is hydrogen.

4. A compound according to claim 1 which is 8-ethyl-cyclohexano(f)-chromone-2-carboxylic acid.

5. A compound according to claim 1 which is 8-ethyl-2'3'-dihydropyrano chromone-2-carboxylic acid.

6. A compound according to claim 1 which is 2-methyl-9-oxo-9H-2,3-dihydrofuro[5,4-f][1]benzopyran-7-carboxylic acid.

7. A compound according to claim 1 which is 3-methyl-9-oxo-9H-furo[2,3][1]benzopyran-7-carboxylic acid.

8. A compound according to claim 1 which is 8-ethyl-cyclohexano[f]chromone-2-carboxylic acid.

9. A compound accordng to claim 1 in the form of a pharmaceutically acceptable salt thereof.

10. A compound of the formula:

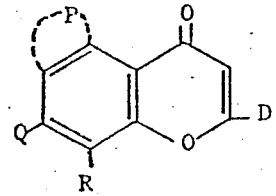

in which Q and R, which may be the same or different, are each hydrogen or alkyl C 1 to 6, P represents a 3 or 4 membered alkylene chain or a 2 or 3 memberd alkylene chain interrupted or terminated by an oxygen atom, which chains are unsubstituted or are substituted by an alkyl C 1 to 6 substituent, and D represents a carboxylic acid halide or nitrile.

* * * * *